(12) United States Patent
Kim et al.

(10) Patent No.: US 10,432,560 B2
(45) Date of Patent: Oct. 1, 2019

(54) VOICE CONTROLLED MULTIMEDIA CONTENT CREATION

(71) Applicant: Motorola Mobility LLC, Chicago, IL (US)

(72) Inventors: Steve S Kim, Park Ridge, IL (US); Joel Clark, Woodridge, IL (US); Robert Zurek, Antioch, IL (US)

(73) Assignee: Motorola Mobility LLC, Chicago, IL (US)

( * ) Notice: Subject to any disclaimer, the term of this patent is extended or adjusted under 35 U.S.C. 154(b) by 420 days.

(21) Appl. No.: 14/801,995

(22) Filed: Jul. 17, 2015

(65) Prior Publication Data

US 2017/0019362 A1    Jan. 19, 2017

(51) Int. Cl.
| | | |
|---|---|---|
| *G06F 15/16* | (2006.01) | |
| *H04L 12/58* | (2006.01) | |
| *G10L 17/02* | (2013.01) | |
| *G10L 15/22* | (2006.01) | |
| *G10L 15/18* | (2013.01) | |

(52) U.S. Cl.
CPC .......... *H04L 51/10* (2013.01); *G10L 15/1815* (2013.01); *G10L 15/22* (2013.01); *G10L 17/02* (2013.01); *G10L 2015/223* (2013.01); *G10L 2015/225* (2013.01)

(58) Field of Classification Search
CPC ... H04L 51/10; G10L 17/02; G10L 2015/223; G10L 2015/225; G10L 15/22; G06F 3/0481; G06F 3/017; G06F 3/167; G06F 3/16; H04N 7/17318; H04N 21/8549

USPC .......................................................... 709/206
See application file for complete search history.

(56) References Cited

U.S. PATENT DOCUMENTS

| | | | | |
|---|---|---|---|---|
| 2005/0137878 A1* | 6/2005 | Roth | ...................... | H04M 1/271 704/275 |
| 2006/0294195 A1* | 12/2006 | Hyatt | ................ | H04M 1/72547 709/217 |
| 2007/0165790 A1* | 7/2007 | Taori | ................... | H04M 3/5307 379/67.1 |
| 2007/0288970 A1* | 12/2007 | Tedenvall | ......... | H04L 29/06027 725/86 |
| 2008/0133230 A1* | 6/2008 | Herforth | ................ | G01C 21/26 704/235 |
| 2009/0234655 A1* | 9/2009 | Kwon | ..................... | G10L 15/30 704/270.1 |

(Continued)

*Primary Examiner* — William G Trost, IV
*Assistant Examiner* — Tan Doan
(74) *Attorney, Agent, or Firm* — SBMC

(57) ABSTRACT

Voice controlled multimedia content creation techniques are discussed in which a multimedia package is created and shared to a specified destination responsive to voice commands. The voice commands can be received by a device as a single stream (e.g., a single phrase) that causes automatic performance of a sharing sequence or as a series of multiple voice commands that are input in response to prompts for voice input as part of the sharing sequence. The voice commands can be recognized and handled by a content creation system of the device to select a clip for tagging of content (such as captured audio or video). The selected clip is then combined with the content to create the multimedia package. Voice commands can also be employed to specify a destination for sharing of the content, such as one or more contacts or a particular sharing site.

20 Claims, 5 Drawing Sheets

(56) References Cited

U.S. PATENT DOCUMENTS

| | | | |
|---|---|---|---|
| 2012/0124146 A1* | 5/2012 | Hsiao | H04L 51/36 709/206 |
| 2014/0281975 A1* | 9/2014 | Anderson | G06F 3/0481 715/716 |
| 2016/0055885 A1* | 2/2016 | Hodulik | G06K 9/00751 386/241 |
| 2016/0104045 A1* | 4/2016 | Cho | G06K 9/00751 386/223 |
| 2016/0189714 A1* | 6/2016 | Abdelsamie | G10L 21/00 704/270.1 |
| 2016/0225371 A1* | 8/2016 | Agrawal | G06F 3/04842 |

\* cited by examiner

VOICE CONTROLLED MULTIMEDIA CONTENT CREATION

BACKGROUND

A variety of kinds of computing devices have been developed to provide computing functionality to users in different settings. For example, a user may interact with a mobile phone, tablet computer, laptop computer, personal computer, wearable device or other computing device to check email, surf the web, compose texts, interact with applications, and so on. Users often share content using devices such as by distributing a photo to friends or uploading content to a social networking site. Using traditional techniques, though, it can be complicated for users to create multimedia content and share content to a destination, particularly when using mobile devices. For example, tagging and sharing an image or video may involve numerous steps and interactions with multiple interfaces and applications. The process can be time consuming and the user may have to remember different manual steps and menu selections involved in sharing to different destinations, which can lead to user dissatisfaction and frustration.

BRIEF DESCRIPTION OF THE DRAWINGS

The detailed description is described with reference to the accompanying figures. In the figures, the left-most digit(s) of a reference number identifies the figure in which the reference number first appears. The use of the same reference numbers in different instances in the description and the figures may indicate similar or identical items.

DETAILED DESCRIPTION

Figure 1:
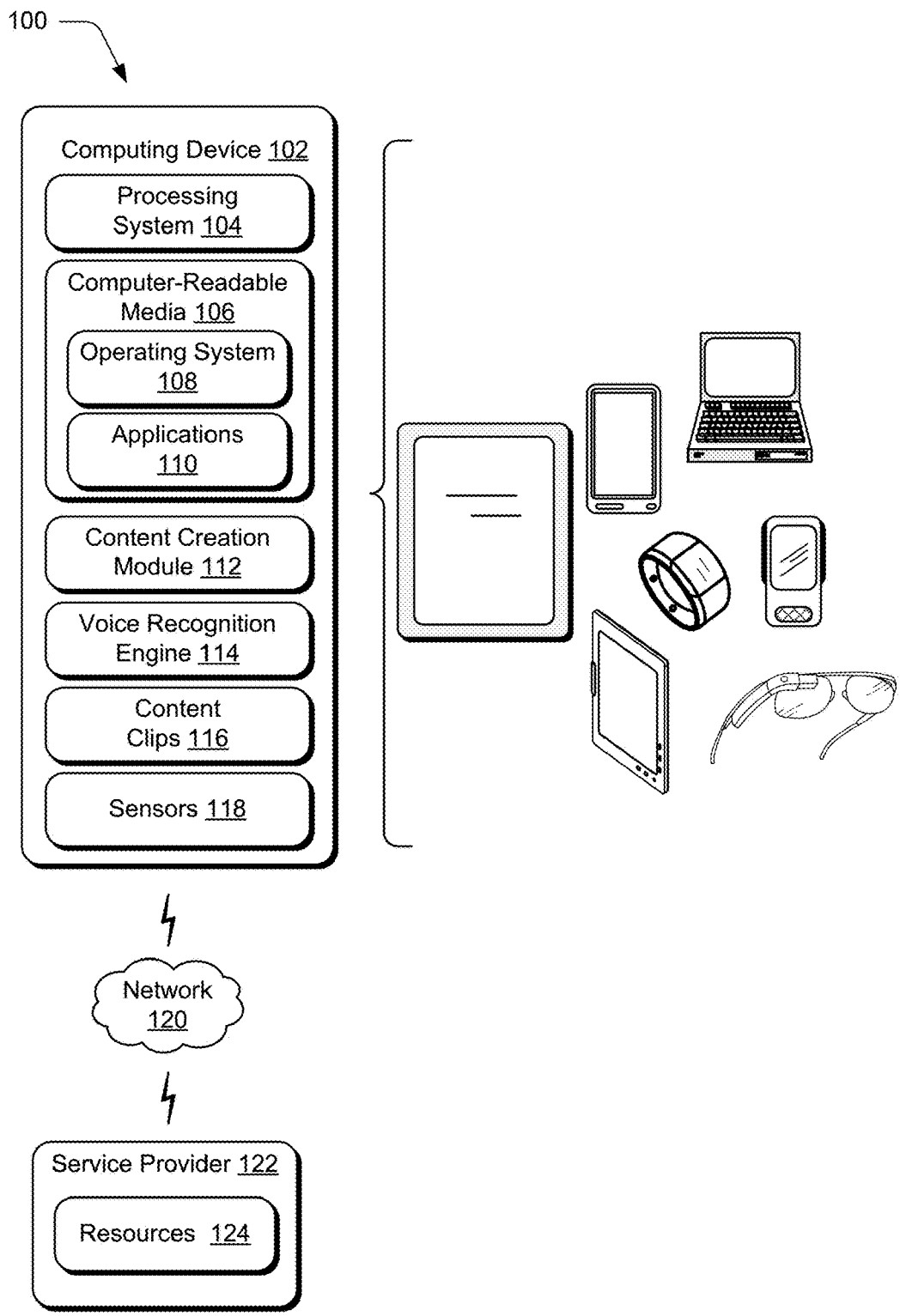
FIG. 1 is an illustration of an example operating environment that is operable to employ the voice controlled multimedia content creation techniques described herein in accordance with one or more implementations.

Voice controlled multimedia content creation techniques are discussed herein. In one or more implementations, voice commands are defined that trigger operations for a sharing sequence in which a multimedia package is created by a device and shared to a specified destination. The voice commands can be received by the device as a single stream (e.g., a single command phrase) that causes automatic performance of the sharing sequence or as a series of multiple voice commands that are input in response to prompts for voice input as part of the sharing sequence. In each case, the voice commands can be handled by a content creation system of the device to select a clip for tagging of content (such as captured audio or video). The selected clip is then combined with the content to create the multimedia package. Voice commands can also be employed to specify a destination for sharing of the content, such as one or more contacts or the name of a particular sharing site.

When voice commands are detected, the content creation system is configured to invoke a voice recognition engine to parse captured audio and identify the content for sharing, determine a clip to tag the content, and/or ascertain the specified destination. The content creation system then operates to create the multimedia package in an appropriate format for the specified destination and cause communication of the multimedia package to the specified destination.

The content creation system can be configured to provide multiple options for selection of a clip to add to the multimedia package. For example, an existing clip can be specified as part of a voice command that initiates the sharing sequence or in response to a prompt to designate the clip exposed as part of the sequence. Further, an option to record a new clip can be exposed during the sequence. Additionally, the content creation system can collect and utilize a variety of different contextual data to inform the content creation process and enable automatic selection of clips for tagging based at least in part upon the contextual factors. The analysis of such contextual factors is used to match a particular clip to the interaction context or environment represented by the contextual factors.

For example, data obtained from an array of sensors including a microphone, camera, GPS receiver, accelerometer, compass, a temperature sensor etc. can be employed to determine contextual factors for interaction with the device such as device location, proximity, recognition of users present, a current activity, and/or audio context, to name a few examples. These and other contextual factors can be used to understand the interaction context and automatically select an appropriate clip and combine the clip with content for a multimedia package.

In one approach, the content creation system can be configured to expose multiple available options and prompt a user to select one of the available options for clip selection as part of the sharing sequence. In additional or alternatively, a particular mode to use for clip selection can be designated from the available by user/device settings, in which case clip selection occurs in accordance with the settings. In an implementation, the system can be configured to implement an automatic selection based on contextual factors in the absence of interaction to select a particular clip or set the mode (as long as automatic selection is enabled). Further details regarding these and other aspects of techniques for voice controlled multimedia content creation are provided in the following discussion.

Operating Environment

FIG. 1 illustrates an operating environment in accordance with one or more implementations, generally at 100. The environment 100 includes a computing device 102 having a processing system 104 with one or more processors and devices (e.g., CPUs, GPUs, microcontrollers, hardware elements, fixed logic devices, etc.), one or more computer-readable media 106, an operating system 108, and one or more applications 110 that reside on the computer-readable media and which are executable by the processing system. The processing system 104 may retrieve and execute computer-program instructions from applications 110 to provide a wide range of functionality to the computing device 102, including but not limited to gaming, office productivity, email, media management, printing, networking, web-browsing, and so forth. A variety of data and program files related to the applications 110 can also be included, examples of which include games files, office documents, multimedia files, sound files, image files, video files, emails, data files, web pages, user profile and/or preference data, and so forth.

The computing device 102 can be embodied as any suitable computing system and/or device such as, by way of example and not limitation, a gaming system, a desktop computer, a portable computer, a tablet or slate computer, a handheld computer such as a personal digital assistant (PDA), a cell phone, a set-top box, a wearable device (e.g., watch, band, glasses, etc.), and the like. For example, the computing device 102 can be implemented as a computer, set-top box, and/or a gaming system that is connected to a display device to display media content. Alternatively, the computing device may be any type of portable computer, mobile phone, or portable device that includes an integrated display. A computing device may also be configured as a wearable device that is designed to be worn by, attached to, carried by, or otherwise transported by a user. One example of a computing system that can represent various systems and/or devices including the computing device 102 is shown and described below in relation to FIG. 5.

The computing device 102 may further include or make use of a content creation module 112 that represents functionality operable to facilitate creation, storing and/or sharing of multimedia content (e.g., images, audio, video, tag data, content package) in accordance with techniques described above and below. For example, in response to detection of particular voice commands, the content creation module 112 performs operations for a sharing sequence that allows a user to easily create and/or share a multimedia package that combines one or more content items (e.g., images, videos, graphics, etc.) with clips used to tag the content with supplemental information, captions, messages, annotations, contextual data and so forth. The content creation module 112 may reside on the computing device 102, or may exist as a cloud service connected to the computing device 102 over a network 120. The content creation module 112 may also reside in the processing system 104 or as separate hardware, such as an ASIC on the computing device 102. In one or more implementations, the clip is configured as an audio clip that is combined with the one or more content items. For example, an image or sequence of image captured of a group of friends at a restaurant can be tagged with an audio clip that indicates where the group is, who is in the group, and what they are doing, such as audio or text that indicates "Here is a picture of Adam and Bryan enjoying dinner at Red Robin."

In order to produce such multimedia packages, the content creation module 112 can include or make use of a voice recognition engine 114 that represents functionality for processing and interpretation of sound that is input to the device via a microphone. Processing implemented by the voice recognition engine 114 can include both voice and speech recognition in which sound captured by the device is processed for content and/or characteristics. Voice recognition involves converting audio into text or other word representations. The word representations can then be parsed to recognize particular commands, keywords, triggers, and/or contextual factors indicated by an input audio stream (e.g., a spoken word or phrase). Speech recognition involves using speech patterns to identify different users and distinguish between users based upon input audio. Thus, the voice recognition engine 114 is operable under the influence of the content creation module 112 to process audio input and recognize one or more voice commands contained in the audio input to direct processing for creation and communication of the multimedia package.

In response to commands, identities, and contextual factors resolved via operation of the voice recognition engine 114, the content creation module 112 can operate to obtain appropriate content clips 116 in various ways including retrieving a pre-existing clip specified in a voice command, prompting a user to select or record a clip, and/or automatically selecting a clip based on contextual factors. The content clips 116 depicted in FIG. 1 represent various different types of clips that can be obtained from various sources. As noted the clips can include audio clips or tags. In addition or alternatively, content clips 116 can include video clips, still images, graphic objects, animations, text tags and other content for tagging content items. Content clips 116 can be derived from multimedia stored locally on a device such as a library of music, captured clips, sound files, and the like. Content clips 116 can also be accessed and acquired from a remote locations, such as from cloud storage associated with a device or via a service designed to make content clips 116 available to clients over a network. Once a clip for tagging of content is obtained, the content creation module 112 combines the clip with the content to create the multimedia package. Additionally, content creation module 112 can identify a destination for the multimedia package and cause delivery to the destination using appropriate formats and communication protocols.

As represented in FIG. 1, the computing device can include a plurality of sensors 118 that represent various different kinds of sensors and combinations of sensors operable to detect various characteristics, capture data, and produce different types of sensor data. Data collected via the sensors 118 can be used in various ways in conjunction with the techniques described herein. For example, the sensors 118 can include a microphone for capture of sound and conversion of the sound into audio data. Sound captured via the microphone can be processed to detect voice commands that can be used to drive operations for multimedia content creation as described in this document. Sensors 118 can also include a camera that can be used to capture images, series of images, and video that can be used as content items for multimedia packages.

Additionally, various kinds of sensors 118 (including the microphone and camera) can be utilized to derive contextual data that informs the content creation process and enables automatic selection of clips for tagging based at least on part upon one or more contextual factors. For example, the computing device 102 can be configured with an array of sensors including one or a combination of a microphone, camera, GPS receiver, accelerometer, compass, a temperature sensor, and other suitable sensors. The array of sensors enables determination of contextual factors for interaction with the device such as device location, proximity, recognition of one or more users, user activity, and/or audio context, to name a few examples. Additional contextual factors can be derived directly from captured sound and voice commands. The contextual factors are used to understand the interaction context and automatically select an appropriate content clip for a multimedia package that matches the context.

The environment 100 further depicts that the computing device 102 may be communicatively coupled to a network 120. The network 120 can be accessed via a wired or wireless network interface associated with the device. By way of example, the device can be connected via the network 120 to a service provider 122, which enables the computing device 102 to access and interact with various resources 124 made available by the service provider 122. The resources 124 can include any suitable combination of content and/or services typically made available over a network by one or more service providers. For instance, content can include various combinations of text, video, ads, audio, multi-media streams, animations, images, webpages, and the like. Some examples of services include, but are not limited to, an online computing service (e.g., "cloud" computing), an authentication service, web-based applications, a file storage and collaboration service, a search service, messaging services such as email and/or instant messaging, and a social networking service. In the context of techniques described herein, the resources 124 can also include content clips 116 and/or corresponding services designed to make the clips available over the network for use with multimedia packages, including cloud storage services and locations from which clips can be retrieved. Resources 124 may further include cloud storage locations and/or services to which content items may be shared.

Having described an example operating environment, consider now example details and procedures associated with one or more implementations.

Example Procedures

The following discussion describes example procedures for voice controlled multimedia content creation in accordance with one or more implementations. The procedures may be implemented utilizing the previously described environment, system, devices, and components and in connection with any suitable hardware, software, firmware, or combination thereof. The procedures are shown as a set of blocks that specify operations performed by one or more devices and are not necessarily limited to the orders shown for performing the operations by the respective blocks. In at least some embodiments, the procedures may be implemented by way of suitably configured devices, such as by a computing device 102 that includes or otherwise make use of a content creation module 112 and/or voice recognition engine 114.

Functionality, features, and concepts described in relation to the examples in the preceding discussion may be employed in the context of the procedures described herein. Further, functionality, features, and concepts described in relation to different procedures below may be interchanged among the different procedures and are not limited to implementation in the context of an individual procedure. Moreover, blocks associated with different representative procedures and corresponding figures herein may be applied together and/or combined in different ways. Thus, individual functionality, features, and concepts described in relation to different example environments, devices, components, and procedures herein may be used in any suitable combinations and are not limited to the particular combinations represented by the enumerated examples.

Figure 2:
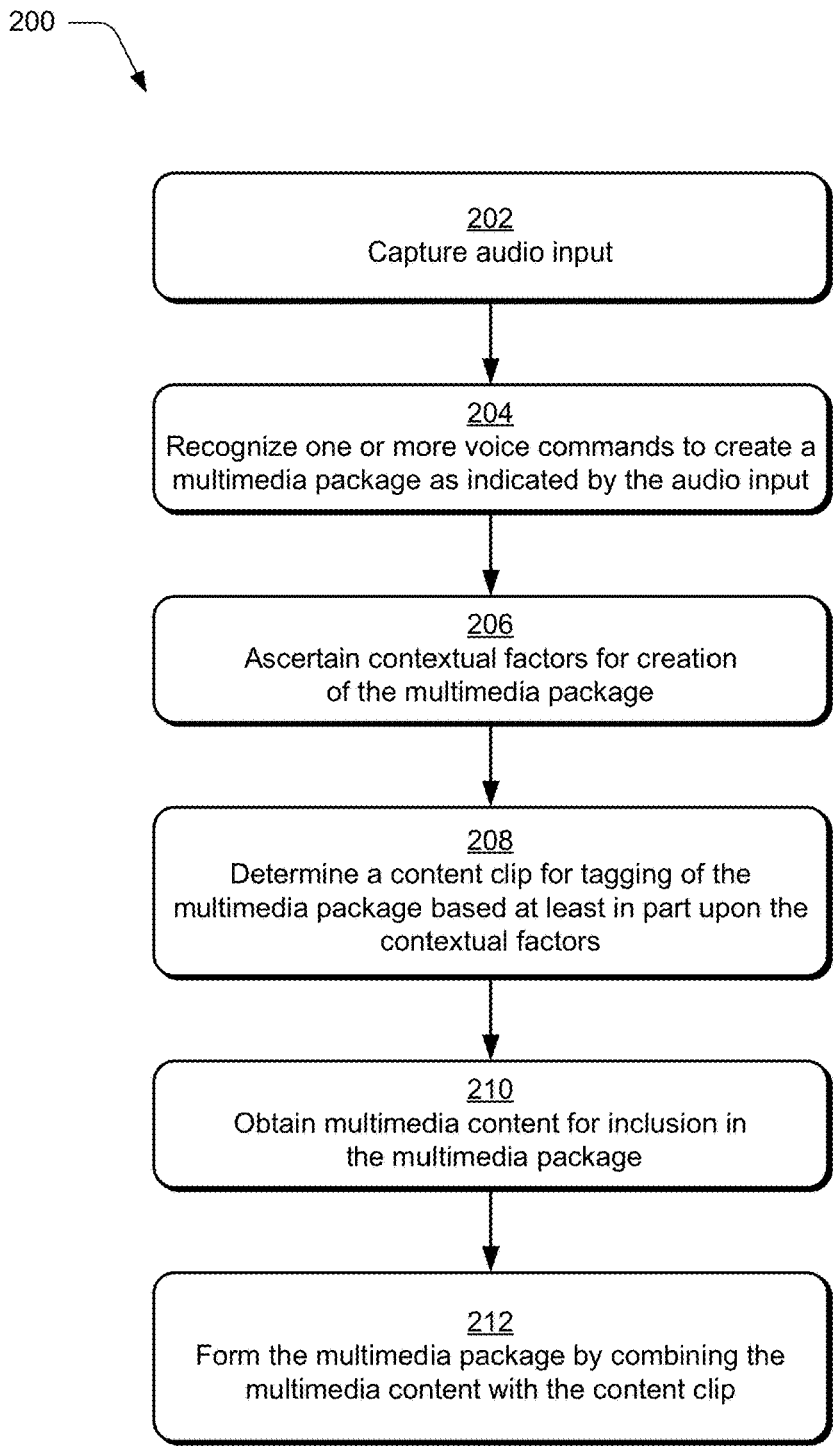
FIG. 2 depicts an example procedure in which a multimedia package is formed in accordance with one or more implementations.

FIG. 2 depicts an example procedure 200 in which a multimedia package is formed in accordance with one or more implementations. Audio input is captured (block 202) and one or more voice commands to create a multimedia package as indicated by the audio input are recognized (block 204). For example, sound captured via a microphone of a device can be processed into audio data and analyzed to detect voice commands that are reflected by the captured sound. In particular, a content creation module 112 can invoke a voice recognition engine 114 to perform various sound processing including conversion of sound into words and phrases, and parsing of the converted sound (e.g., audio data) to recognize voice commands.

Audio input may be in a designated format, such as a particular phrase construction that includes a trigger word/phrase and optionally additional parameters indicative of content to send, a clip to include, and/or a specified destination. By way of example and without limitation, a phrase such as "Hey, my device . . . capture image and post to Facebook with last recorded clip" may be spoken to cause multimedia content creation by the system. In this form "Hey, my device" represents a trigger word/phrase, "capture image" indicates the content item to use, "post to Facebook" indicate the destination, and "with last recorded clip" indicate the tag to combine with the content item.

A generalization of the form in the preceding example can be expressed as "[Trigger Phrase]+[Content Item ID]+[Destination]+[Clip Selection]" where the bracketed items represent different example parameters that can be recognized. The system can be configured to parse input audio to recognize the example parameters, as well as other parameters defined for voice control. One or more of the parameters may be optional and the system can be configured to recognize different combinations of the parameters and respond to the different combinations in different ways.

If the audio input phrase includes sufficient information to create and send a package without further input, a sharing sequence can be initiated and performed automatically in response to a single input stream that includes the one or more voice commands. In other words, a single voice command phrase in an appropriate format can be employed to drive the content creation processes described herein without relying upon multiple separate voice commands.

In addition or alternatively, audio may be captured as multiple distinct instances of audio input that are provided in response to audio or visual prompts exposed at different times throughout the sharing sequence. In this approach, a series of multiple voice commands are utilized to control the content creation process. The approach of using multiple voice commands can be employed when the initial command does not include sufficient information and/or in accordance with settings to select the manner in which creation is to occur (e.g., s user set a toggle to select a single command mode or multiple command mode).

For example, a user may speak just a "[Trigger Phrase]" to initiate a sharing sequence in which multiple additional prompts to supply further input are made. Responses to the additional prompts are used to obtain further parameters for creation of the multimedia package, such as the destination, a clip selection, and identification of content. Likewise, a phrase in the form of "[Trigger Phrase]+[Destination]" can be employed to share content to a specified destination. The content to share and a clip to use can be created and/or identified as part of the sharing sequence using additional prompts and corresponding response. Thus, the operations and prompts that are used for the sharing sequence can vary in dependence upon the particular combination of parameters that are used to initiate content creation. Effectively, different combinations can be used to enter different modes for content creation supported by the system. Any parameters missing from the initiating phrase can then be supplied responsive to prompts and/or selection of options that are exposed during the sharing sequence.

As part of the creation process, contextual factors are ascertained for creation of the multimedia package (block 206) and a content clip is determined for tagging of the multimedia package based at least in part upon the contextual factors (block 208). As noted, content clips 116 for inclusion in multimedia package can be selected in various ways, examples of which are discussed above and below herein. This can include using a pre-existing clip, recording a new clip, or auto-generating a clip in accordance with settings and user input. A particular example in which multiple options for clip selection can be exposed is discussed below in relation to FIG. 4.

The selection of a clip can be based at least in part upon one or more contextual factors derived for interaction with the device. For instance, a device can include an array of sensors 118 (examples of which were previously described) that may be utilized to derive various contextual factors such as locations, people present, time of day, user activity, and so forth. Contextual factors, such as the name of people, destinations, and so forth can also be derived from voice commands and phrases used to control the process. Contextual factors can be used to make suggestions regarding tags and/or to auto-generate tags that are appropriate based on the context of the interaction. Generally speaking, the contextual factors may enable determinations regarding where the device is located, what the environment is like at the location, who is present around the device, and what is going on when content creation is triggered.

Multimedia content for inclusion in the multimedia package obtained (block 210) and the multimedia package is formed by combining the multimedia content with the content clip (block 212). For example, content for inclusion in the multimedia package can be identified via the initial audio input used to trigger creation using appropriate parameters. In addition or alternatively, a prompt to select or create the content can be output during the sequence. Additional voice commands or selections can then be provided in response to the prompt to identify the content item to be shared. The multimedia package can be formed in any suitable way. For example, an entire content clip can be added into the content file as a tag element or embedded stream. In this case, the content clip can be played back directly from the multimedia package.

In another approach, a link to a content clip can be inserted as metadata to enable retrieval of the clip from a suitable storage location. In this approach, content clips can remain stored in a remotely accessible storage, such as a user's online storage. The link provides recipients of the package with access to download and playback the corresponding clip. Accordingly, the size of the multimedia package can be kept relatively small for distribution to a destination and recipients can then access, download, and/or utilize the linked clip "on-demand" as needed.

Additionally, the content creation module 112 can be configured to customize the multimedia package based upon various contextual factors, such as the location, intended recipient, destination, a detected activity, and so forth. For example, customizations associated with a particular location that is recognized can be added to the package. Thus, if images are captured at a chain restaurant, a jingle, borders, and/or a color scheme associated with the chain restaurant can be suggested and/or added to the package. In other examples, a sports theme can be used if a sports activity is detected, musical notes or other music related graphics can be employed for a concert setting, outdoor related customizations can be added to an outdoor scene, and so forth. A variety of other kinds of contextual customizations are also contemplated.

In an implementation, customizations can be implemented via a local network to which the device is connected. For example, a device can be paired to a local network of an establishment such as a restaurant. Through the local network, the establishment can make custom items available such as jingles, borders, songs, logos, and the like. Custom items can also include ads, coupons, and other offers. Thus, custom items can be used to create customizations associated with a particular location when the device is connected to the local network. For example, if a picture is created at a stadium such as Lambeau Field, corresponding customizations can be used to enhance the image, such as a green and gold border, a football icon, a team border, and so forth.

The multimedia package that is formed can be stored locally at a device and/or uploaded to a remote storage location or cloud-based storage service associated with the device/user. Additionally, the multimedia package can be formatted for and/or distributed to different specified destinations in various ways. Details regarding techniques to configure and deliver multimedia packages to specified destinations are provided in relation to the discussion of the example procedure of FIG. 3 that follows.

Figure 3:
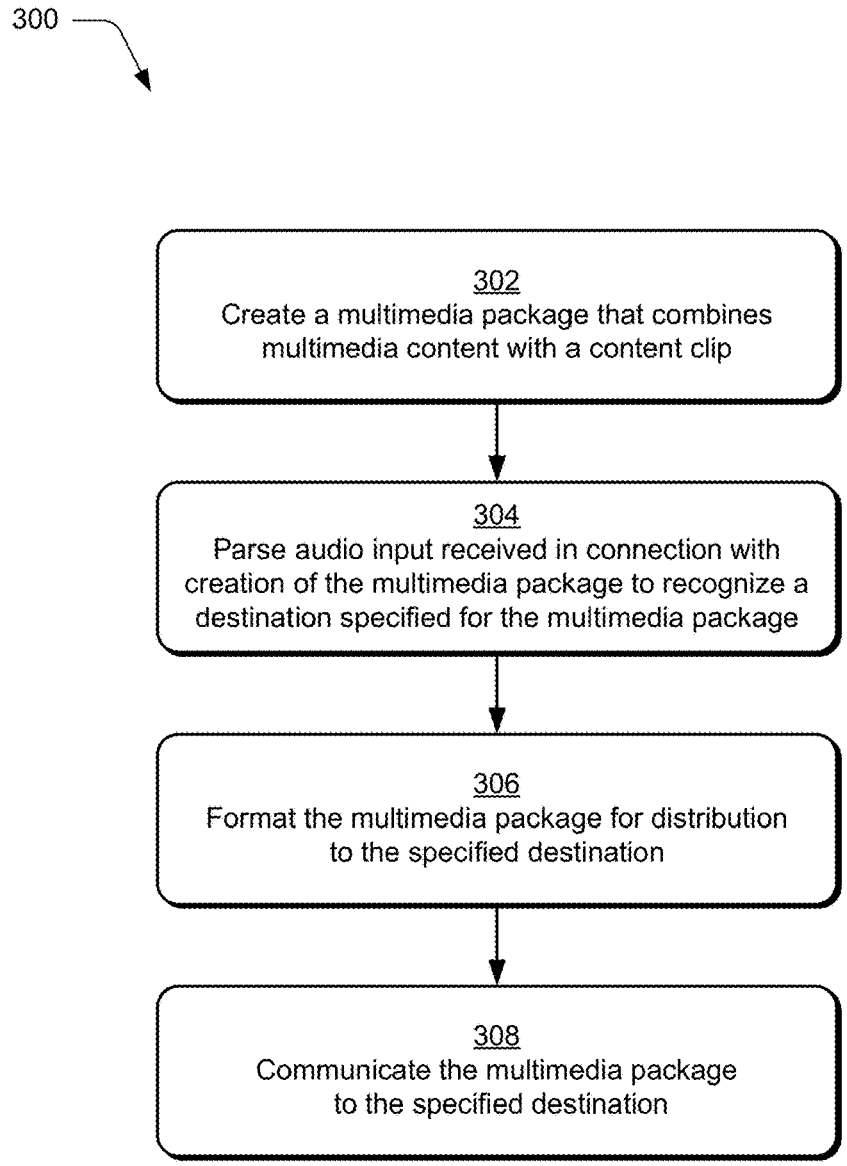
FIG. 3 depicts an example procedure in which a multimedia package is communicated to a specified destination in accordance with one or more implementations.

In particular, FIG. 3 depicts an example procedure 300 in which a multimedia package is communicated to a specified destination in accordance with one or more implementations. A multimedia package is created that combines multimedia content with a content clip (block 302). A multimedia package that includes content clips can be formed in various ways described herein. Content clips can be configured as audio tags, textual tags that are derived from audio input, and/or other tags that are produce at least in part using audio input. Other types of content clips as mentioned previously can also be employed to tag content items. By way of example and not limitation, a multimedia package can be formed in accordance with the preceding discussion of the example procedure 200 of FIG. 2 or in accordance with the following discussion of example procedure 400 of FIG. 4. A multimedia package that includes a content clip can then be distributed in various ways to one or more destinations.

To do so, audio input received in connection with creation of the multimedia package is parsed to recognize a destination specified for the multimedia package (block 304) and the multimedia package is formatted for distribution to the specified destination (block 306). Then, the multimedia package is communicated to the specified destination (block 308). For example, audio input can include a parameter indicative of a destination or recipient, such as the [Destination] tag previously described. Input indicative of one or multiple destinations can be provided as part of an initial trigger phrase and/or in response to subsequent prompts to provide the destination(s). The content creation module 112 is configured to support various different types of destinations and communication mechanisms. Types of destinations can include local storage, cloud storage locations, sharing and social services such as Facebook, Twitter, Instagram, etc., people and groups (e.g., contacts), and so forth. Communication mechanisms can include text messages, instant messages, emails, file uploads, web posts, and/or site specific protocols for supported services and sites, to name a few examples. Thus, a user can indicate "share to Facebook" to upload an image to a corresponding social account or "email to Bob" to send content to a particular friend(s). Destinations that are specified are recognized by operation of the voice recognition module 114 as discussed herein.

If the destination and other information sufficient to create and send the package is contained in an initial triggering phrase, the content creation module 112 may operate in response to the single audio input stream to perform the complete sharing sequence without additional audio input or user interaction. In addition or alternatively, any missing parameters or information can be acquired by prompts that are exposed during the sharing sequence as noted previously. Thus, sharing of multimedia packages with associated clips may occur automatically in response to an appropriate triggering phrase, or using a series of multiple audio inputs to acquire different parameters and enable selections of different available options.

In one or more implementations, the multimedia package is formatted for distribution to the specified destination. This may involve creating and configuring of packages in different ways depending upon the destination, the way in which a package is being communicated, and the formats and protocols supported by the destinations. In other words, one or more destination dependent characteristics of the multimedia package such as the file format, size, file type, communication mechanism and other destination dependent factors can be adapted to correspond to the specified destination. For example, a package for delivery to a friend as an email can automatically be formatted as an email having the package and addressed to the friend. Likewise, a package for posting to a particular sharing site can be configured in an appropriate image size/format for the site and using the proper protocol for communication to the site. The content creation module 112 is configured to automatically handle these and other formatting tasks for the user so that the user is relieved of having to make numerous selections and/or manually configure the package differently for different destinations.

Figure 4:
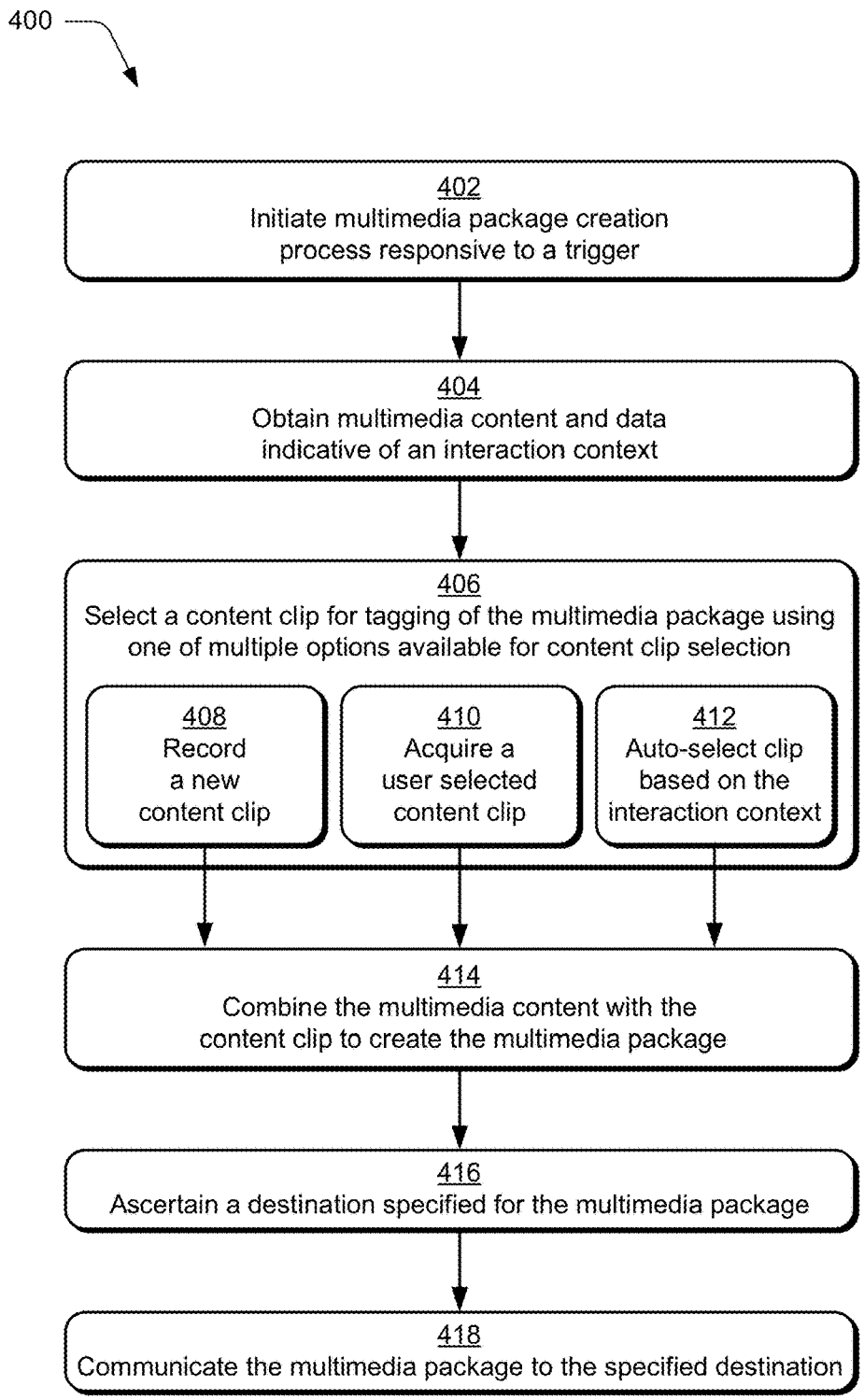
FIG. 4 depicts an example procedure in which a content clip for inclusion in a multimedia package is selected and combined with content to create the package in accordance with one or more implementations.

FIG. 4 depicts an example procedure 400 in which a content clip for inclusion in a multimedia package is selected and combined with content to create the package in accordance with one or more implementations. A multimedia package creation process is initiated in response to a trigger (block 402). For example, various different triggering phrases can be used to initiate a sharing sequence as discussed herein. In addition or alternatively, a sharing sequence can be triggered using other mechanisms including but not limited to launching a particular application, gesture detection, proximity detection, motion triggers, button operations, menu selections, and other triggering events.

Responsive to the trigger, multimedia content and data indicative of an interaction context is obtained (404). Content items for a multimedia can be acquired in various ways. As discussed herein, pre-existing content items can be identified via the triggering phrase or in response to subsequent prompts. Content may be located in local storage or a user's cloud storage. Content can also be accessed from a service provider over a network using a link or other identifier. In addition or alternatively, the content can include images, videos, and other content that is captured via the device in connection with the sharing sequence and/or contemporaneously with triggering of the content creation process.

Additionally, sensors 118 can be utilized to derive contextual data that informs the content creation process and enables automatic selection of clips for tagging based at least on part upon one or more contextual factors. In particular, an array of sensors can be used to capture data indicative of an interaction context associated with content created via the device including information regarding where the device is located, who is present, what activities are taking place, environmental conditions, and so forth. Among other things, contextual factors can be used to match content items to clips. Based on the matching, clips can be automatically selected and/or suggested to users as potential tags for the content item.

A content clip is selected for tagging of the multimedia package using one of multiple options available for content clip selection (block 406). Various different options and combinations of options for clip selection are contemplated, examples of which are discussed herein. For instance, one or more potential tags identified based on contextual factors can be exposed as selectable options. Other options can also be provided such as to create a new clip, access a clip from a particular location, or use a previously identified clip. Various options can be exposed individually or in combination with one another.

Multiple available options can be offered each time a user interacts to create content and engage in a sharing sequence. In an implementation, a user can also set a default or preferred option during a set-up dialog, as part of the sharing sequence, through menu selections or otherwise. Thus, if a user wishes to defer to the system for clip selection, the user can set the system to use a "pick for me" option by default. On the other hand, the user could set the system to "prompt me each time" or use another one of the available options by default.

As depicted in the representative example of FIG. 4, the available options can include recording of a new content clip (block 408), acquiring a user selected content clip (410) or auto-selecting a content clip based on the interaction context (block 412). These options can be made available during a sharing sequence as noted above. For example, a user interface can be configured to present the various options and prompt a user to select one of the options. The prompt can be a visual and/or audio prompt. A user can respond to the prompt by providing additional audio input to select an option. Other selection techniques such as touch input, gestures, pointer device selections, and so forth may also be employed.

Then, the multimedia content is combined with the content clip to create the multimedia package (block 414), a destination specified for the multimedia package is ascertained (block 416), and the multimedia package is communicated to the specified destination (block 418). These operations may occur using techniques discussed in relation to the example procedure 300 of FIG. 3, and elsewhere in this document. In addition to tagging of a multimedia package with a content clip as described herein, an option to create a text message can optionally be provided at various stages of the sharing sequence. For example, after the package is prepared to send, the content creation module 112 can query the user as to whether to add a text message to the package. If the user provides input verbally or otherwise to add the text message, the user is prompted to provide the message. This can be accomplished by capturing additional audio input and converting the audio input to text using a speech to text algorithm. A user could also choose to input the text message using a keyboard or other input device.

As noted, aspects of the foregoing example components, devices, and procedures can be combined and utilized in various ways to facilitate multimedia content creation and are not limited to the example implementations that are enumerated. The techniques enable voice control over the content creation process in various ways. The techniques can be implemented using "always on" voice recognition to simplify and speed up content creation, and in particular association of audio clips with images and other content items. Similarly, text can be tagged to the multimedia content using speech to text input and used as a field that can be searched later to find content. At a later time, the user may trigger the voice recognition system to search the device content for the tag that was attributed to the content in the content creation process. Alternatively, instead of storing the tag information as text for future search, the multimedia content can be tagged with a speech model of the user's speech utterance that can be later searched for using a speech recognition algorithm.

Having considered example details and procedures, consider a discussion of an example system in accordance with one or more implementations.

Example System and Device

Figure 5:
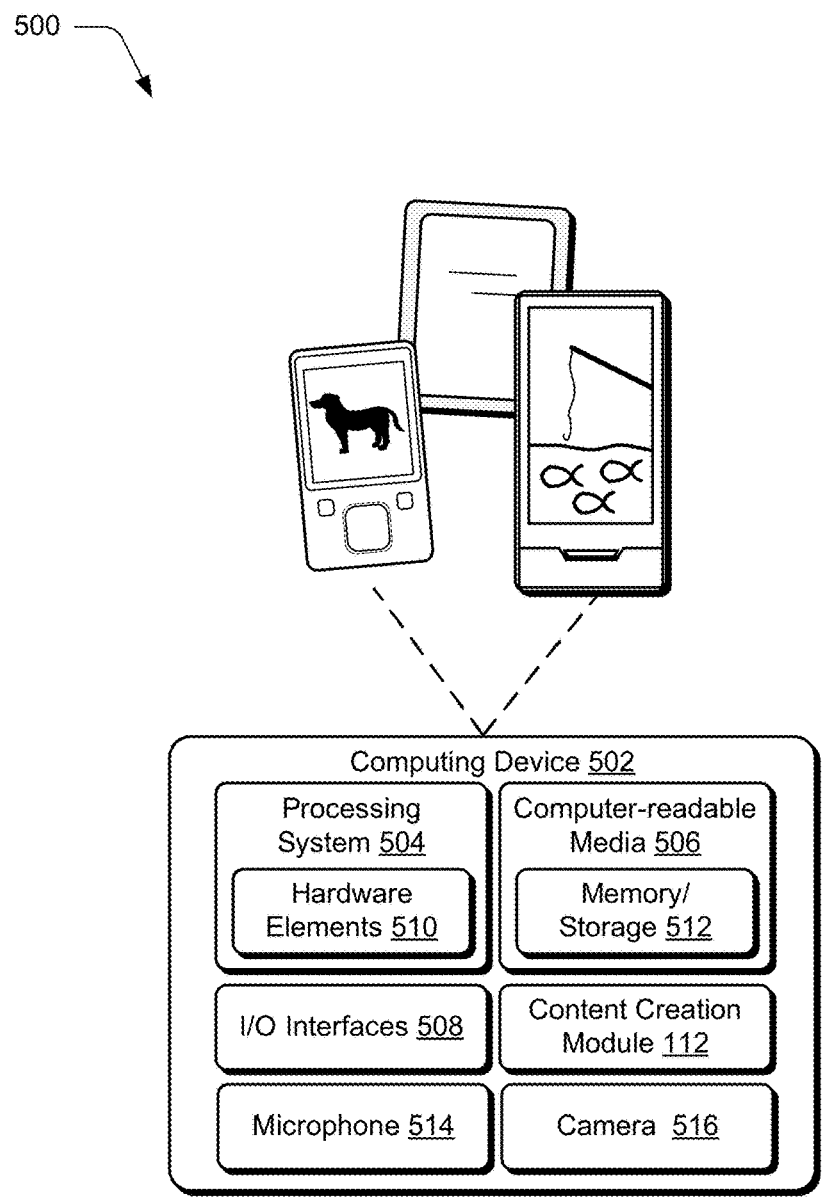
FIG. 5 illustrates an example system that includes an example computing device that is representative of one or more computing systems and/or devices that may implement the various techniques described herein.

FIG. 5 illustrates an example system generally at 500 that includes an example computing device 502 that is representative of one or more computing systems and/or devices that may implement the various techniques described herein. This is illustrated through inclusion of the content creation module 112 which operates as described above. The computing device 502 may be, for example, a server of a service provider, a device associated with a client (e.g., a client device), an on-chip system, a computing device 102, and/or any other suitable computing device or computing system. As depicted, the computing device 502 can include a content creation module 112 and other components discussed in this document that operate to facilitate voice controlled multimedia content creation techniques in the described manner.

The example computing device 502 is illustrated as including a processing system 504, one or more computer-readable media 506, and one or more I/O interface 508 that are communicatively coupled, one to another. Although not shown, the computing device 502 may further include a system bus or other data and command transfer system that couples the various components, one to another. A system bus can include any one or combination of different bus structures, such as a memory bus or memory controller, a peripheral bus, a universal serial bus, and/or a processor or local bus that utilizes any of a variety of bus architectures. A variety of other examples are also contemplated, such as control and data lines.

The processing system 504 is representative of functionality to perform one or more operations using hardware. Accordingly, the processing system 504 is illustrated as including hardware elements 510 that may be configured as processors, functional blocks, and so forth. This may include implementation in hardware as an application specific integrated circuit or other logic device formed using one or more semiconductors. The hardware elements 510 are not limited by the materials from which they are formed or the processing mechanisms employed therein. For example, processors may be comprised of semiconductor(s) and/or transistors (e.g., electronic integrated circuits (ICs)). In such a context, processor-executable instructions may be electronically-executable instructions.

The computer-readable storage media 506 is illustrated as including memory/storage 512. The memory/storage 512 represents memory/storage capacity associated with one or more computer-readable media. The memory/storage component 512 may include volatile media (such as random access memory (RAM)) and/or nonvolatile media (such as read only memory (ROM), Flash memory, optical disks, magnetic disks, and so forth). The memory/storage component 512 may include fixed media (e.g., RAM, ROM, a fixed hard drive, and so on) as well as removable media (e.g., Flash memory, a removable hard drive, an optical disc, and so forth). The computer-readable media 506 may be configured in a variety of other ways as further described below.

Input/output interface(s) 508 are representative of functionality to allow a user to enter commands and information to computing device 502, and also allow information to be presented to the user and/or other components or devices using various input/output devices. Examples of input devices include a keyboard, a cursor control device (e.g., a mouse), a microphone, a scanner, touch functionality (e.g., capacitive or other sensors that are configured to detect physical touch), a camera (e.g., which may employ visible or non-visible wavelengths such as infrared frequencies to recognize movement as gestures that do not involve touch), and so forth. Examples of output devices include a display device (e.g., a monitor or projector), speakers, a printer, a wired or wireless network interface, tactile-response device, and so forth. In the depicted example, the computing device is illustrated as having microphone 514 that can be used for capture of audio and input of voice commands and a camera 516 that can be used to provide image-based content such as pictures, videos, and the like.

Various techniques may be described herein in the general context of software, hardware elements, or program modules. Generally, such modules include routines, programs, objects, elements, components, data structures, and so forth that perform particular tasks or implement particular abstract data types. The terms "module," "functionality," and "component" as used herein generally represent software, firmware, hardware, or a combination thereof. The features of the techniques described herein are platform-independent, meaning that the techniques may be implemented on a variety of commercial computing platforms having a variety of processors.

An implementation of the described modules and techniques may be stored on or transmitted across some form of computer-readable media. The computer-readable media may include a variety of media that may be accessed by the computing device 502. By way of example, and not limitation, computer-readable media may include "computer-readable storage media" and "computer-readable signal media."

"Computer-readable storage media" refers to media and/or devices that enable persistent and/or non-transitory storage of information in contrast to mere signal transmission, carrier waves, or signals per se. Thus, computer-readable storage media does not include signals per se or signal bearing media. The computer-readable storage media includes hardware such as volatile and nonvolatile, removable and non-removable media and/or storage devices implemented in a method or technology suitable for storage of information such as computer readable instructions, data structures, program modules, logic elements/circuits, or other data. Examples of computer-readable storage media may include, but are not limited to, RAM, ROM, EEPROM, flash memory or other memory technology, CD-ROM, digital versatile disks (DVD) or other optical storage, hard disks, magnetic cassettes, magnetic tape, magnetic disk storage or other magnetic storage devices, or other storage device, tangible media, or article of manufacture suitable to store the desired information and which may be accessed by a computer.

"Computer-readable signal media" refers to a signal-bearing medium that is configured to transmit instructions to the hardware of the computing device 502, such as via a network. Signal media typically may embody computer readable instructions, data structures, program modules, or other data in a modulated data signal, such as carrier waves, data signals, or other transport mechanism. Signal media also include any information delivery media. The term "modulated data signal" means a signal that has one or more of its characteristics set or changed in such a manner as to encode information in the signal. By way of example, and not limitation, communication media include wired media such as a wired network or direct-wired connection, and wireless media such as acoustic, RF, infrared, and other wireless media.

As previously described, hardware elements 510 and computer-readable media 506 are representative of modules, programmable device logic and/or fixed device logic implemented in a hardware form that may be employed in some embodiments to implement at least some aspects of the techniques described herein, such as to perform one or more instructions. Hardware may include components of an integrated circuit or on-chip system, an application-specific integrated circuit (ASIC), a field-programmable gate array (FPGA), a complex programmable logic device (CPLD), and other implementations in silicon or other hardware. In this context, hardware may operate as a processing device that performs program tasks defined by instructions and/or logic embodied by the hardware as well as a hardware utilized to store instructions for execution, e.g., the computer-readable storage media described previously.

Combinations of the foregoing may also be employed to implement various techniques described herein. Accordingly, software, hardware, or executable modules may be implemented as one or more instructions and/or logic embodied on some form of computer-readable storage media and/or by one or more hardware elements 510. The computing device 502 may be configured to implement particular instructions and/or functions corresponding to the software and/or hardware modules. Accordingly, implementation of a module that is executable by the computing device 502 as software may be achieved at least partially in hardware, e.g., through use of computer-readable storage media and/or hardware elements 510 of the processing system 504. The instructions and/or functions may be executable/operable by one or more articles of manufacture (for example, one or more computing devices 502 and/or processing systems 504) to implement techniques, modules, and examples described herein.

CONCLUSION

Although the example implementations have been described in language specific to structural features and/or methodological acts, it is to be understood that the implementations defined in the appended claims is not necessarily limited to the specific features or acts described. Rather, the specific features and acts are disclosed as example forms of implementing the claimed features.

What is claimed is:

1. A method implemented by a computing device, the method comprising:
  capturing audio input in an environment;
  recognizing a voice command to create a multimedia package as indicated by the audio input, the voice command including a single input stream that comprises a single phrase, the single phrase initiating a sharing sequence that comprises:
    ascertaining contextual factors for creation of the multimedia package, the contextual factors ascertained from context sensor inputs that correspond to detected environment conditions in the environment in which the audio input is captured;
    determining a content clip for tagging of the multimedia package based at least in part upon the contextual factors, the content clip including at least an audio file;
    obtaining multimedia content for inclusion in the multimedia package identified via the voice command, the voice command including an indication of a destination for the multimedia package and an identification of the multimedia content for inclusion in the multimedia package;
    customizing the multimedia content by including additional content as part of the multimedia content upon recognizing a geographic location described in the audio input;
    creating the multimedia package by combining the customized multimedia content with the content clip; and
    communicating the multimedia package to the destination identified via the voice command.

2. A method as described in claim 1, wherein the multimedia content for inclusion in the multimedia package is pre-existing content identified via the voice command.

3. A method as described in claim 1, wherein the ascertaining of the contextual factors comprises collecting data from an array of sensors included with the computing device, the array of sensors designed to detect one or more people proximate the computing device in the environment.

4. A method as described in claim 1, wherein the determining of the content clip for tagging of the multimedia package comprises automatically selecting the content clip based on analysis of the contextual factors to match the content clip to an interaction context associated with the multimedia package.

5. A method as described in claim 1, further comprising:
  parsing the audio input to recognize the destination to which the multimedia package is communicated.

6. A method as described in claim 1, further comprising:
  formatting the multimedia package for distribution to the destination, wherein the formatting of the multimedia package for distribution to the destination comprises adapting one or more destination dependent characteristics of the multimedia package to correspond to the destination.

7. A method as described in claim 6, wherein the one or more destination dependent characteristics comprises one or more of file format, file size, file type, or communication protocol.

8. The method as described in claim 1, wherein the additional content comprises one or more of a color scheme, a music note, a logo, a border design, a coupon, or an advertisement related to the location described in the audio clip, and wherein the additional content is utilized to visually customize the multimedia content.

9. A method implemented by a computing device, the method comprising:
  capturing audio input in an environment;
  parsing the captured audio input to recognize a voice command that includes a single phrase to initiate a multimedia package creation process;
  initiating the multimedia package creation process responsive to recognition of the single phrase, the multimedia package creation process comprising:
    obtaining multimedia content identified via the voice command and data indicative of an interaction context indicating a device location in the environment and one or more people proximate the computing device in the environment in which the audio input was captured;
    selecting a content clip for tagging the multimedia package using one of multiple options available for content clip selection identified via the voice command, the content clip including at least an audio file associated with the interaction context;
    customizing the multimedia content by including additional content to the multimedia content upon recognizing a geographic location described in the audio input;

combining the customized multimedia content with the selected content clip to create the multimedia package;

ascertaining a specified destination for the multimedia package identified via the voice command; and communicating the multimedia package to the specified destination.

10. A method as described in claim 9, wherein the ascertaining of the destination specified for the multimedia package comprises:

determining, based on analysis of the voice command, whether the voice command includes a stated destination parameter;

when the voice command includes the stated destination parameter, using the destination indicated by the stated destination parameter as the destination for communication of the multimedia package.

11. A method as described in claim 9, wherein obtaining data indicative of the interactive context comprises collecting data from an array of sensors included with the computing device.

12. A method as described in claim 9, further comprising:

formatting the multimedia package for distribution to the specified destination, wherein the formatting of the multimedia package for distribution to the destination comprises adapting one or more destination dependent characteristics of the multimedia package to correspond to the destination.

13. A method as described in claim 12, wherein the one or more destination dependent characteristics comprises one or more of file format, file size, file type, or communication protocol.

14. The method as described in claim 9, wherein the additional content comprises one or more of a color scheme, a music note, a logo, a border design, a coupon, or an advertisement related to the location described in the audio clip.

15. A computing device comprising:

a processing system;

a microphone to capture audio input in an environment, the audio input including a single phrase that comprises a trigger phrase parameter, a specified destination, and additional parameters;

a voice recognition engine to parse the audio input to recognize the trigger phrase parameter, the specified destination, and the additional parameters; and a content creation module executable via the processing system to perform operations for multimedia content creation in response to the audio input including the single phrase, the operations including:

creating a multimedia package responsive to recognition of the trigger phrase parameter, the specified destination, and additional parameters, the creating of the multimedia package comprising:

obtaining multimedia content identified by the additional parameters in the audio input and data indicative of an interaction context indicating a device location in the environment and one or more people proximate the computing device in the environment in which the audio input was captured;

selecting a content clip for tagging the multimedia package using one of multiple options available for content clip selection identified by the additional parameters, the content clip including at least an audio file associated with the interaction context;

customizing the multimedia content by including additional content to the multimedia content upon recognizing a geographic location described in the audio input;

combining the customized multimedia content with the selected content clip to create the multimedia package; and formatting the multimedia package for distribution to the specified destination; and communicating the multimedia package to the specified destination.

16. The computing device as described in claim 15, wherein the formatting of the multimedia package for distribution to the specified destination comprises adapting one or more destination dependent characteristics of the multimedia package to correspond to the specified destination.

17. The computing device as described in claim 15, wherein the voice recognition engine is further configured to operate under the influence of the content creation module to process the audio input and recognize a voice command contained in the audio input to direct processing for creation and communication of the multimedia package.

18. The computing device as described in claim 15, wherein the selecting of the content clip comprises selecting the content clip according to a pre-determined default mode set for clip selection.

19. The computing device as described in claim 15, wherein obtaining data indicative of the interactive context comprises collecting data from an array of sensors included with the computing device.

20. The computing device as described in claim 15, wherein the additional content comprises one or more of a color scheme, a music note, a logo, a border design, a coupon, or an advertisement related to the location described in the audio clip.

* * * * *